United States Patent
Chiu et al.

(10) Patent No.: US 10,338,457 B2
(45) Date of Patent: Jul. 2, 2019

(54) ELECTRONIC DEVICE CASING AND PROJECTOR

(71) Applicant: QISDA CORPORATION, Taoyuan (TW)

(72) Inventors: Hsien-Tsung Chiu, Taoyuan (TW); Ying-Fang Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 1 day.

(21) Appl. No.: 15/498,505

(22) Filed: Apr. 27, 2017

(65) Prior Publication Data

US 2018/0314139 A1    Nov. 1, 2018

(51) Int. Cl.
   *G03B 21/16*     (2006.01)
   *G03B 21/14*     (2006.01)

(52) U.S. Cl.
   CPC ........... *G03B 21/16* (2013.01); *G03B 21/145* (2013.01)

(58) Field of Classification Search
   CPC ....... G03B 21/16; G03B 21/20; H05K 5/0213
   USPC .................................................... 353/52–62
   See application file for complete search history.

(56) References Cited

U.S. PATENT DOCUMENTS

| 6,007,205 A * | 12/1999 | Fujimori | G03B 21/16 |
| | | | 348/E9.027 |
| 2002/0027643 A1* | 3/2002 | Takizawa | G03B 21/18 |
| | | | 353/57 |

FOREIGN PATENT DOCUMENTS

| CN | 101354522 A | 1/2009 | |
| JP | 2010175694 A * | 8/2010 | G03B 21/16 |

OTHER PUBLICATIONS

Machine Translation of JP2010175694 A.*

* cited by examiner

*Primary Examiner* — Steven Whitesell Gordon
*Assistant Examiner* — Jerry L Brooks

(57) ABSTRACT

An electronic device casing can be used in a projector and includes a first casing member and a second casing member. The first casing member includes a first side wall. The first casing member and the second casing member are engaged with each other to form an internal accommodating space. The second casing member includes a second side wall. The first side wall and the second side wall are oppositely disposed to form a narrow passage therebetween. The internal accommodating space is connected to an external space of the electronic device casing through the narrow passage. The narrow passage has a non-straight traveling path. Furthermore, the electronic device can includes an air flow bypass passage near the narrow passage.

11 Claims, 8 Drawing Sheets

ELECTRONIC DEVICE CASING AND PROJECTOR

BACKGROUND OF THE INVENTION

1. Field of the Invention

The invention relates to a dust-resistant structure and a projector, and especially relates to an electronic device casing with a dust-resistant structure and a projector therewith.

2. Description of the Prior Art

Many electronic devices need cooling for components whose temperature will rise in operation. One most common solution is to draw air outside the device casing of an electronic device into the device casing through an air vent, e.g. by a fan, and lead the air inside the device casing to the outside of the device casing through another air vent. In fact, some dust suspended in the air is also drawn into the device casing together with the air. Dust is unfavorable for cooling and may be harmful to operations of some components of the electronic device. It is commonly seen to dispose a filter at the air vent for filtering dust from the air is to be drawn into the device casing. However, dust may still get into the device casing from a gap that exist where two casing members are engaged with each other or between a movable component and a casing member through which the movable component protrudes out of the device casing. Furthermore, in principle, that the air flows inside the device casing will produce a lower pressure inside the device casing, which is conducive to drawing the outside air into the device casing through the gap.

SUMMARY OF THE INVENTION

An objective of the invention is to provide an electronic device casing which uses two casing members to form a narrow passage having a non-straight traveling path for slowing an air flow through the narrow passage so that some dust contained in the air flow can be deposited in the narrow passage.

An electronic device casing according to the invention includes a first casing member and a second casing member. The first casing member includes a first side wall. The first casing member and the second casing member are engaged with each other to form an internal accommodating space. The second casing member includes a second side wall. The first side wall and the second side wall are oppositely disposed to form a narrow passage therebetween. The internal accommodating space is connected to an external space of the electronic device casing through the narrow passage. The narrow passage has a non-straight traveling path. Thereby, the narrow passage offers the non-straight traveling path, so an air flow passing through the narrow passage will be slowed so that some dust contained in the air flow can be deposited in the narrow passage without getting into the internal accommodating space together with the air flow.

Another objective of the invention is to provide a projector whose device casing uses two casing members to form a narrow passage having a non-straight traveling path for slowing an air flow through the narrow passage so that some dust contained in the air flow can be deposited in the narrow passage.

A projector according to the invention includes a device casing, a light engine, and a controller. The device casing includes a first casing member and a second casing member. The first casing member includes a first indentation and a first side wall. The first casing member and the second casing member are engaged with each other to form an internal accommodating space. The second casing member includes a second indentation and a second side wall. The first side wall and the second side wall are oppositely disposed to form a narrow passage therebetween. The internal accommodating space is connected to an external space of the device casing through the narrow passage. The narrow passage has a non-straight traveling path. The first indentation and the second indentation are oppositely disposed to form a component installation opening connected to the internal accommodating space. The light engine is disposed in the internal accommodating space. The light engine includes a projection lens. The projection lens is disposed near to the narrow passage and passes through the component installation opening. The controller is disposed in the internal accommodating space and electrically connected to the light engine. Thereby, the narrow passage offers the non-straight traveling path, so an air flow passing through the narrow passage will be slowed so that some dust contained in the air flow can be deposited in the narrow passage without getting into the internal accommodating space together with the air flow.

An objective of the invention is to provide an electronic device casing which uses two casing members to form a component installation opening and uses one of the casing members to form an air flow bypass passage beside the component installation opening for enhancing a cooling applied to a component disposed at the component installation opening.

An electronic device casing according to the invention includes a first casing member and a second casing member. The first casing member includes a first indentation. The second casing member has a second indentation. The first casing member and the second casing member are engaged with each other to form an internal accommodating space and an exposed recess. The first indentation and the second indentation are oppositely disposed to form a component installation opening connected to the internal accommodating space at the exposed recess. The second casing member includes a bottom wall and an air flow bypass passage between the exposed recess and the bottom wall. Two ends of the air flow bypass passage are connected to the internal accommodating space. The two ends are located at two sides of the exposed recess. Thereby, an air flow in the internal accommodating space can pass through the air flow bypass passage so as to perform an efficient cooling to the exposed recess or a component disposed in the exposed recess.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
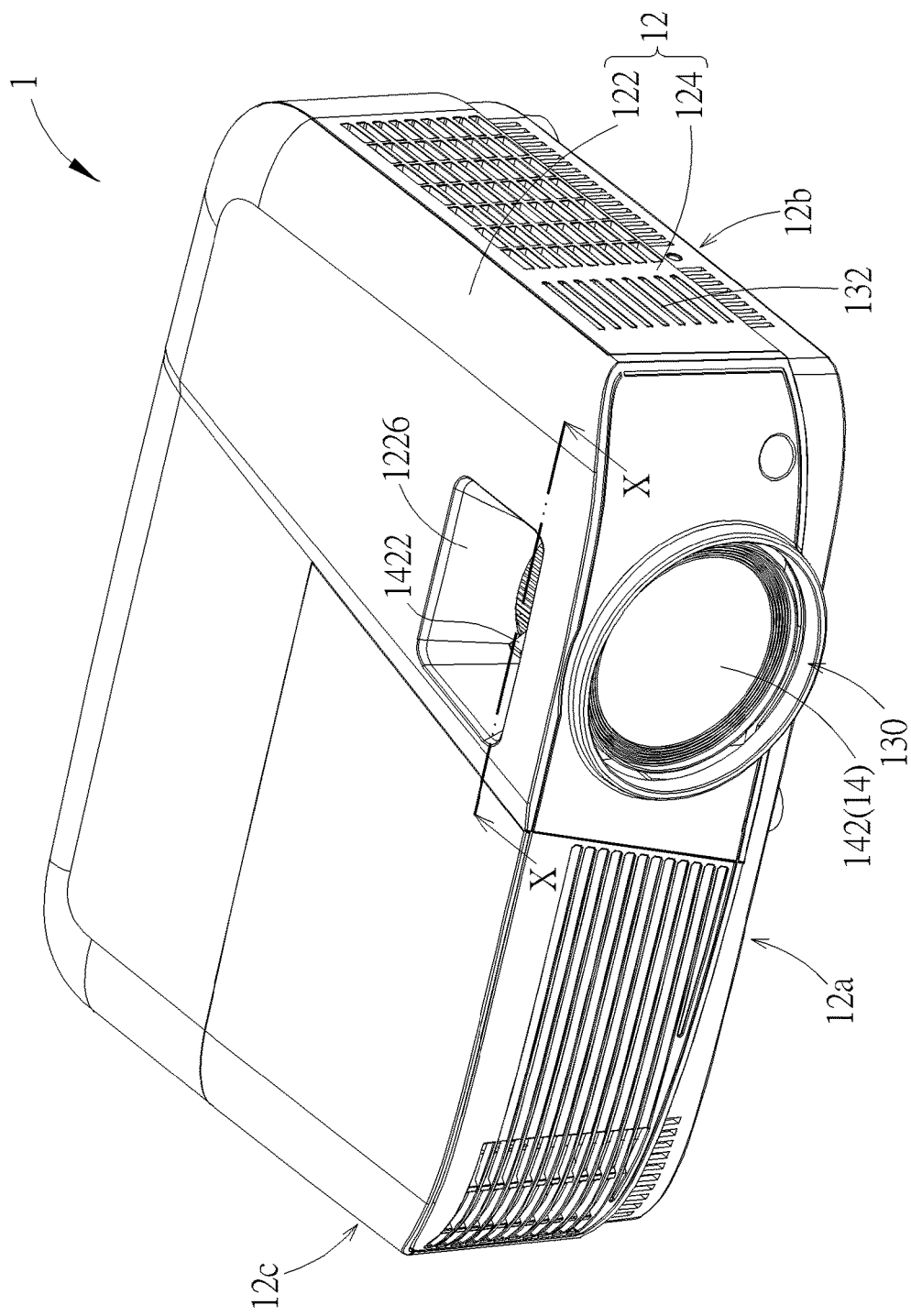
FIG. 1 is a schematic diagram illustrating a projector of an embodiment according to the invention.
Figure 2:
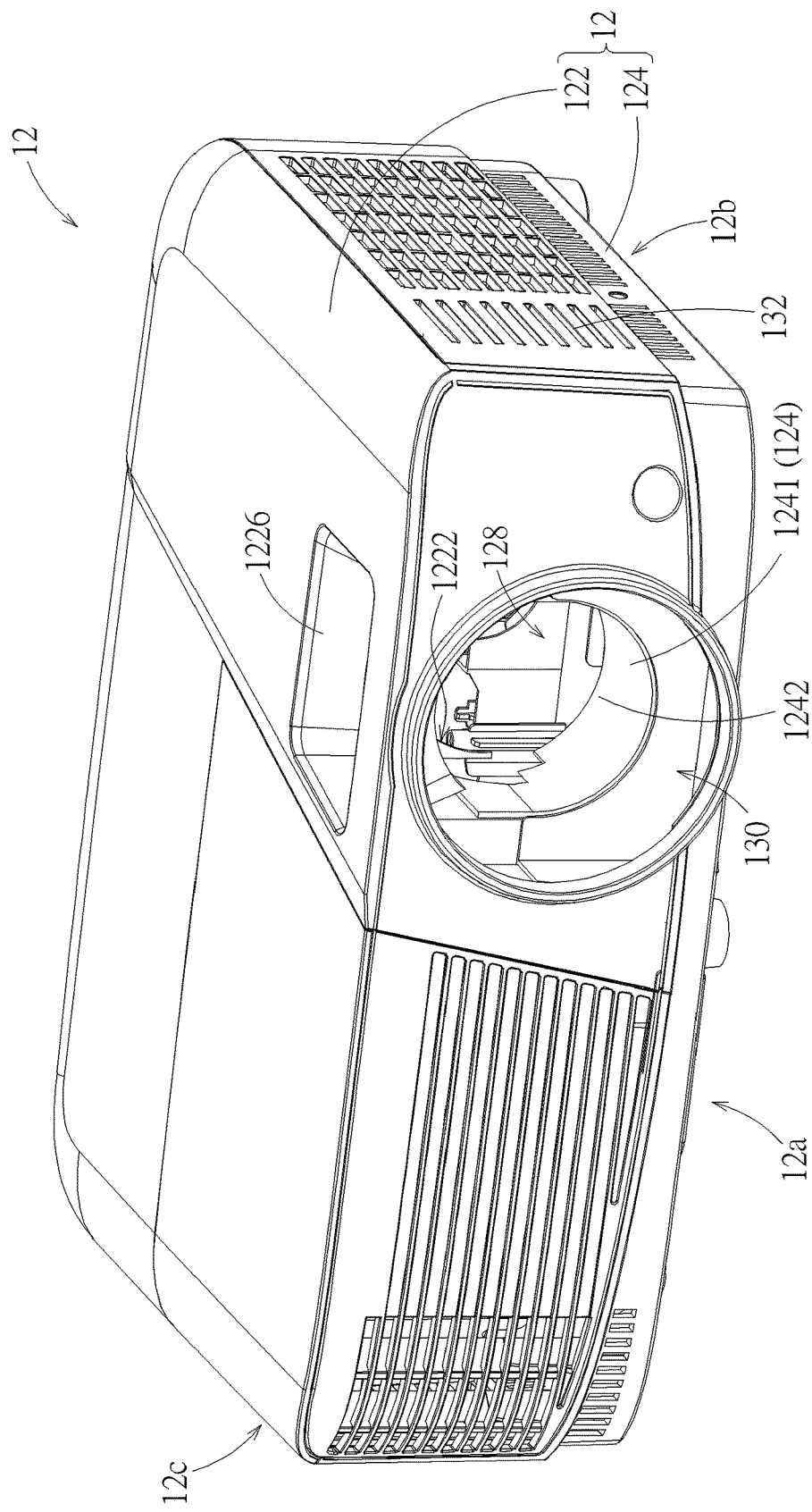
FIG. 2 is a schematic diagram illustrating a device casing of the projector in FIG. 1.

Please refer to FIG. 1 to FIG. 6. A projector 1 of an embodiment according to the invention includes a device casing 12 (or an electronic device casing), a light engine 14, and a controller 16 (shown by a rectangular solid in dashed lines in FIG. 3). The device casing 12 includes a first casing member 122 and a second casing member 124. In the view point of FIG. 1, the first casing member 122 is an upper casing member while the second casing member 124 is a lower casing member, but the invention is not limited thereto. The first casing member 122 includes a first indentation 1222 and a first side wall 1224. The second casing member 124 includes a second indentation 1242 and a second side wall 1244. The first casing member 122 and the second casing member 124 are engaged with each other to form an internal accommodating space 120. The first side wall 1224 and the second side wall 1244 are oppositely disposed to form a narrow passage 126 therebetween. The internal accommodating space 120 is connected to an external space of the device casing 12 through the narrow passage 126. The narrow passage 126 has a non-straight traveling path (indicated by dashed lines in FIG. 6, in which the narrow passage 126 is shown in an exaggerated scale). The first indentation 1222 and the second indentation 1242 being oppositely disposed to form a component installation opening 128 connected to the internal accommodating space 120. The light engine 14 is disposed in the internal accommodating space 120. The light engine 14 includes a projection lens 142, a digital micromirror device 144, and a light source 146; therein, except for the projection lens 142, the other components of the light engine 14 are shown by blocks in dashed lines for simplifying the drawings, and the projection lens 142 is shown as a solid structure in FIG. 5 for simplifying the drawing. The projection lens 142 is disposed near to the narrow passage 126 and passes through the component installation opening 128. The controller 16 is disposed in the internal accommodating space 120. The controller 16 is electrically connected to the light engine 14 for controlling the light source 146 to emit light and the digital micromirror device 144 to reflect the light to the projection lens 142; thereby, the projector 1 can project the light through the projection lens 142 onto a screen to form an image. In practice, the controller 16 can be realized by a circuit board module (e.g. including a circuit board and a processor, a memory, at least one connection interfaces, (e.g. for connecting with the light source 146, the digital micromirror device 144, and other components, e.g. a color wheel of the light engine 14), and other required electronic components which are disposed on the circuit board) and further can be integrated with a power supply (e.g. also realized by a circuit board module); however, the invention is not limited thereto.

In the embodiment, the first casing member 122 and the second casing member 124 are engaged with each other to also form an exposed recess 130. The first side wall 1224 and the second side wall 1244 are located at the exposed recess 130. The external space is defined at the exposed recess 130. The component installation opening 128 is located at the exposed recess 130. The projection lens 142 from the component installation opening 128 extends into the exposed recess 130. In addition, in the embodiment, the focal length of the projection lens 142 is adjustable. The first casing member 122 has a manipulation opening 1226 is connected to the exposed recess 130 and exposed out from the top side of the device casing 12 so that a user can adjust the focal length of the projection lens 142 by moving at least one adjustment stick 1422 of the projection lens 142 which is located in the manipulation opening 1226.

Figure 5:
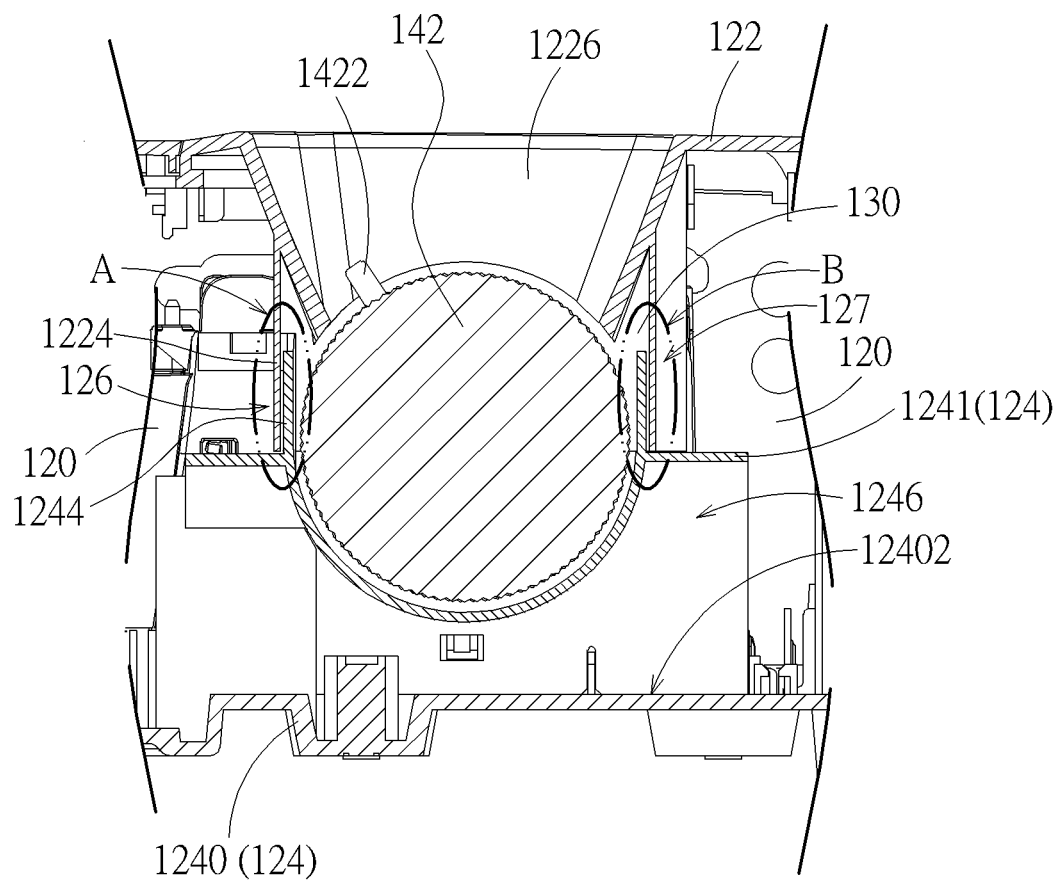
FIG. 5 is a sectional diagram of a portion of the projector in FIG. 1 along the line X-X.
Figure 6:
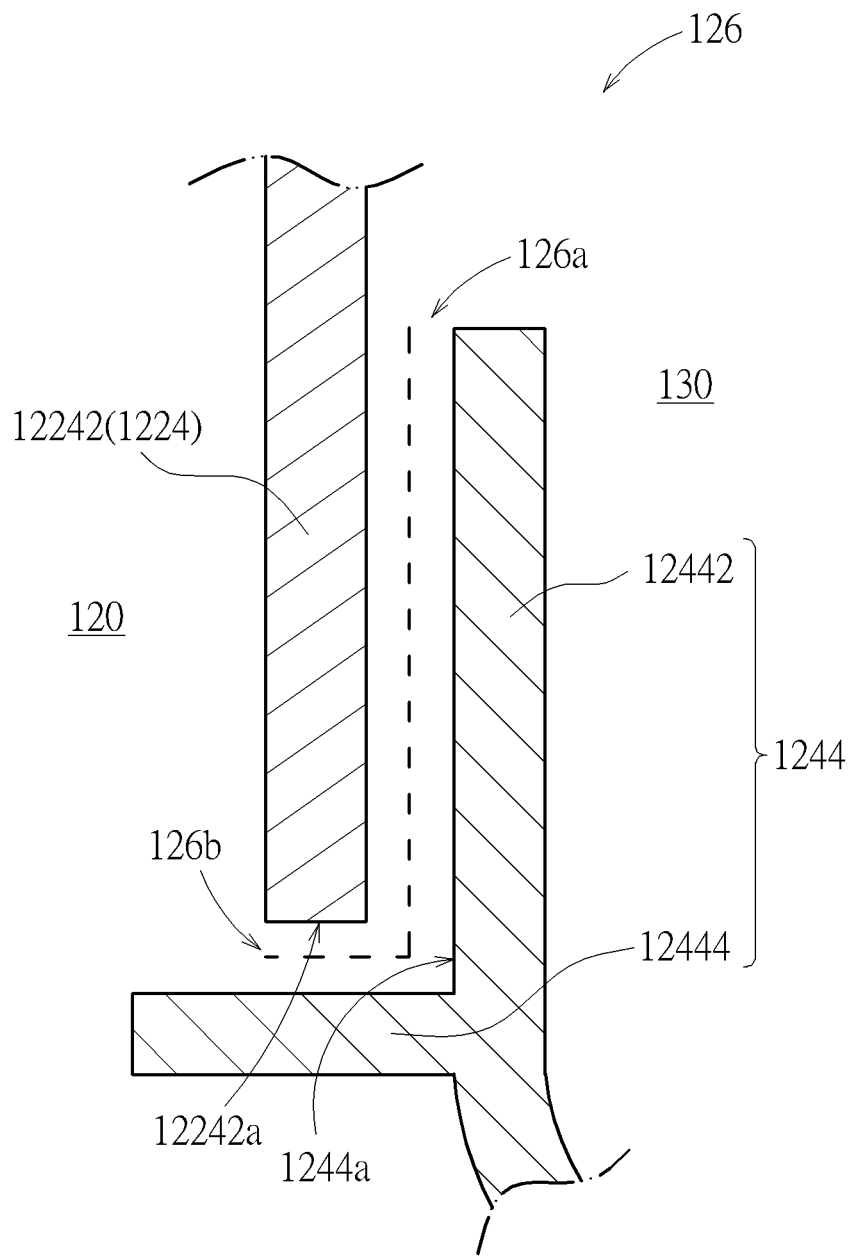
FIG. 6 is an enlarged view of the ellipse A in FIG. 5.

As shown by FIG. 5 and FIG. 6, in the embodiment, the non-straight traveling path shows a J-shaped profile. The narrow passage 126 has an inlet 126a to the exposed recess 130 and an outlet 126b to the internal accommodating space 120. Air in the exposed recess 130 has to make at least one turn for passing through the narrow passage 126 into the internal accommodating space 120. Any turn of the air itself may lead to a disturbance of the air flow which usually makes the air flow slow down. In the embodiment, the non-straight traveling path has a turn of 90 degrees, which will induce a turbulence of the air flow. In practice, if the air is turbulent in the exposed recess 130, the flowing direction of the air is not necessarily parallel to the opening direction of the inlet 126a so the air has to make a turn before entering the narrow passage 126. In other words, the narrow passage 126 (or the non-straight traveling path) makes the flowing speed of the air slow down so that some dust contained in the air flow will be deposited in the narrow passage 126 without getting into the internal accommodating space 120 together with the air flow. Therefore, the air entering the internal accommodating space 120 contains less dust than it does at the exposed recess 130 (or the external space). In practice, when the width of the narrow passage 126 (or the gap between the first side wall 1224 and the second side wall 1244) is small enough, the surfaces of the first side wall 1224 and the second side wall 1244 form the boundaries of the air flow will also reduce the flowing speed of the air flow, which is also conducive to deposit the dust suspended in the air flow in the narrow passage 126. The width (or the gap), even and the length of the narrow passage 126 can be determined for greatly removing the dust suspended in the air flow by a skilled person in the field according to fluid mechanics, which will not be described in details. Furthermore, in the embodiment, the narrow passage 126 is formed not due to manufacturing tolerance.

In addition, in the embodiment, the first side wall 1224 includes a first flat portion 12242. The second side wall 1244 includes a second flat portion 12442 and a protrusion 12444 protruding from the second flat portion 12242 toward the internal accommodating space 120. The first flat portion 12242 and the second flat portion 12442 extend in parallel. The first flat portion 12242 is located between the second flat portion 12442 and the internal accommodating space 120. The protrusion 12444 is near to an edge 12242a of the first flat portion 12242. The narrow passage 126 is formed by the first flat portion 12242, the second flat portion 12442, and the protrusion 12444. Therefore, the 90-degree turn of the non-straight traveling path is located near the edge 12242a and the protrusion 12444 and close to the outlet 126b. Furthermore, in the embodiment, the protrusion 12444 protrudes horizontally so as to accumulate the deposited dust thereon by gravity. In addition, in the embodiment, the narrow passage 126 has flat boundary surfaces (i.e. the surfaces of the first flat portion 12242 and the second flat portion 12442), but the invention is not limited thereto. For example, in practice, the surfaces of the first flat portion 12242 and the second flat portion 12442 can be rough or with a small protrusive or indented structure thereon which is capable of disturbing the air flow in the narrow passage 126. For another example, the first flat portion 12242 and the second flat portion 12442 can be provided in a waved shape so that the non-straight traveling path snakes, which disturbs the air flow in the narrow passage 126 more.

In another aspect, in the embodiment, the outlet 126b is toward the internal accommodating space 120. The second side wall 1244 has an inner wall surface 1244a in the narrow passage 126 opposite to the outlet 126b. Whether the portion of the narrow passage 126 before reaching the inner wall surface 1244a is straight or curved or extends in other shapes, this structural configuration makes the air flow to turn toward the outlet 126b before the air flow leaves the narrow passage 126 from the outlet 126b into the internal accommodating space 120, which is also conducive to the reduction of the flowing speed of the air flow so as to the deposit the dust carried by the air flow.

In addition, in the embodiment, the first side wall 1224 and the second side wall 1244 also form another narrow passage 127 (indicated by an ellipse B in FIG. 5) at the exposed recess 130 opposite to the narrow passage 126. The narrow passage 127 is structurally similar to the narrow passage 126. For descriptions for the narrow passage 127, please refer to the relevant descriptions and figures about the narrow passage 126, which will not be described in addition. In addition, in the embodiment, the narrow passage 127 is located at the exposed recess 130 where the projection lens 142 protrudes out the device casing 12; however, the invention is not limited thereto. In practice, the narrow passage 127 also can be disposed at other positions except for the exposed recess 130, for reducing dust into the device casing 12.

Figure 3:
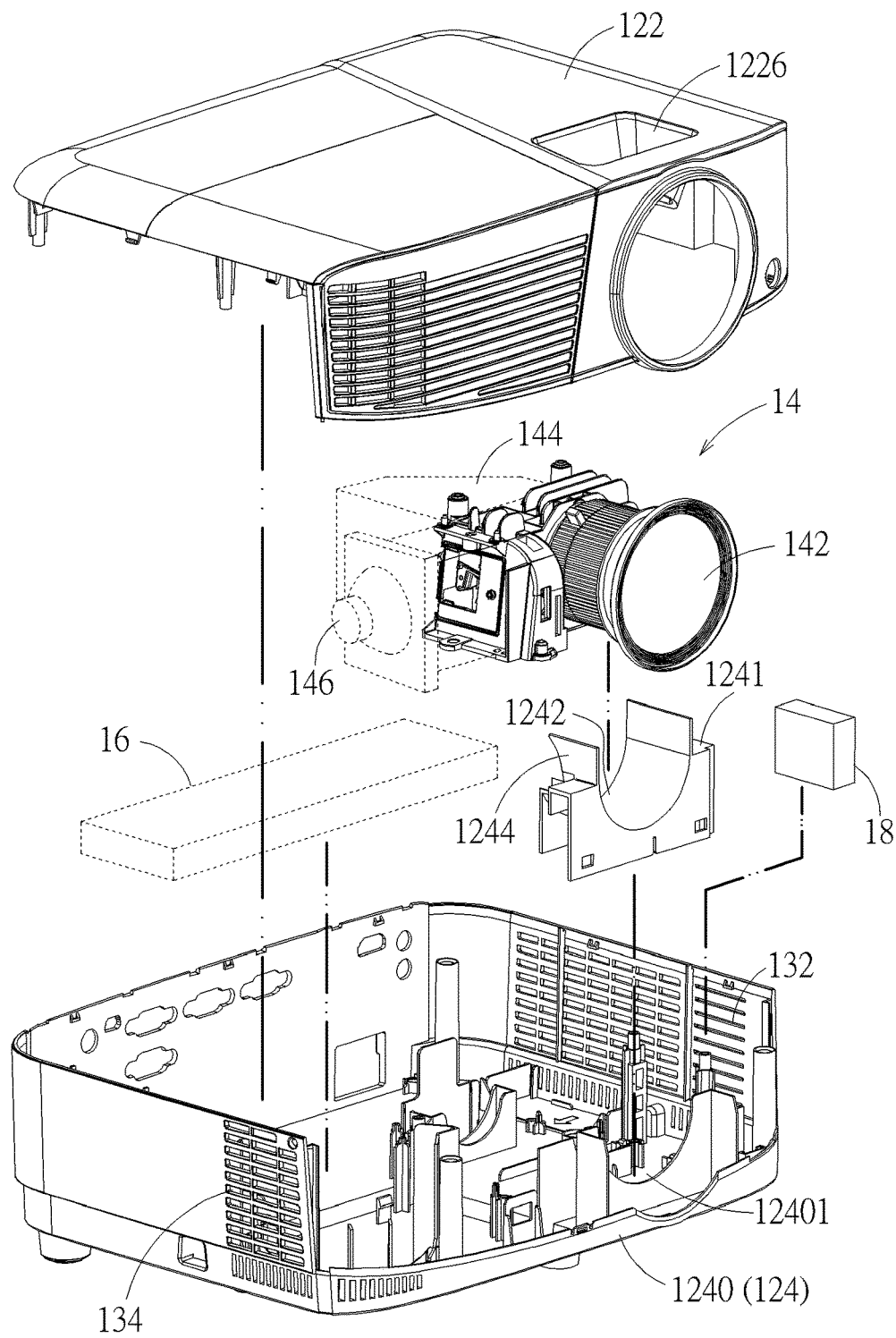
FIG. 3 is an exploded view of the projector in FIG. 1.
Figure 4:
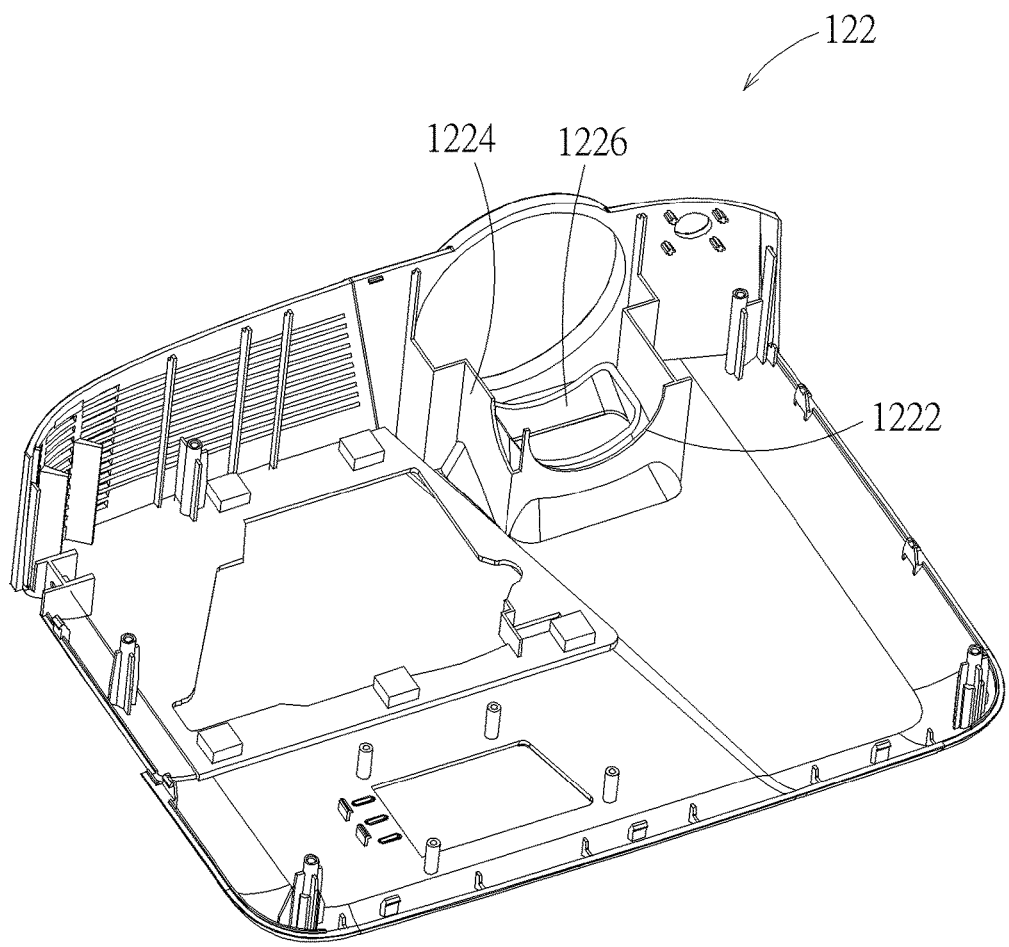
FIG. 4 is a schematic diagram illustrating a first casing member of a device casing of the projector in FIG. 3 in another view point.

As shown by FIG. 3, the second casing member 124 is a two-piece member, but the invention is not limited thereto. Pleas also refer to FIG. 7. In the embodiment, the second casing member 124 includes a casing member body 1240 and a detachable part 1241. The second side wall 1244 is a portion of the detachable part 1241. The detachable part 1241 is also used for forming the exposed recess 130. The detachable part 1241 is attached to a bottom wall 12402 of the casing member body 1240 to form an air flow bypass passage 1246. The air flow bypass passage 1246 is between the exposed recess 130 and the bottom wall 12402. Two ends of the air flow bypass passage 1246 are connected to the internal accommodating space 120. The two ends are located at two sides of the exposed recess 130.

Figure 7:
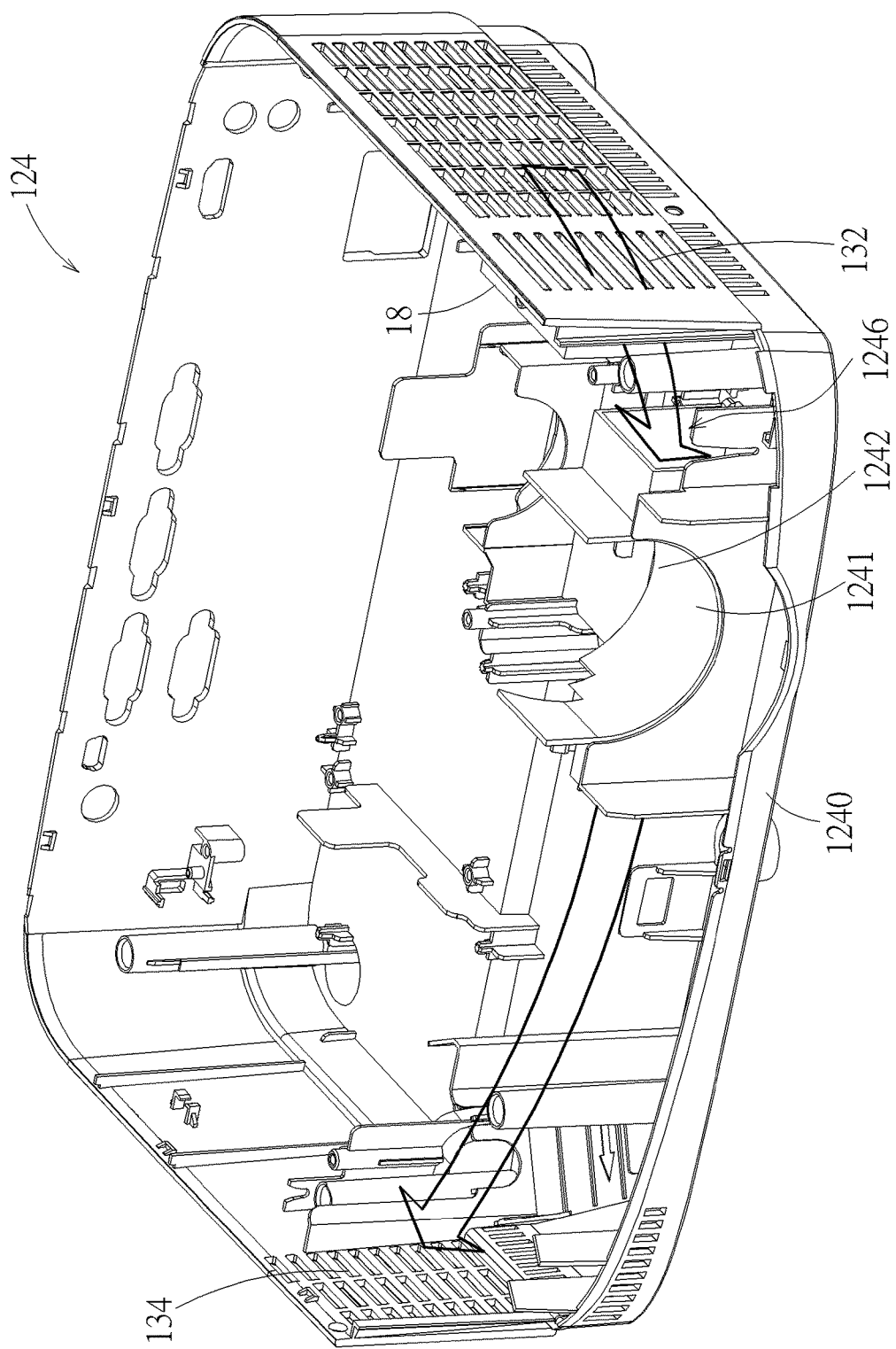
FIG. 7 is a schematic diagram illustrating a second casing member of the device casing of the projector in FIG. 1.

In the embodiment, as shown by FIG. 1, FIG. 3, and FIG. 7, the device casing 12 has a first side 12a, a second side 12b adjacent to the first side 12a, and a third side 12c opposite to the second side 12b. The exposed recess 130 is located at the first side 12a. The device casing 12 has a first air vent 132 and a second air vent 134. The first air vent 132 and the second air vent 134 are disposed at the second side 12b and the third side 12c respectively and connect with the internal accommodating space 120 so that the internal accommodating space 120 can connect with the outside of the device casing 12 through the first air vent 132 and the second air vent 134. In the embodiment, the first air vent 132 and the second air vent 134 are formed on the second casing member 124, but the invention is not limited thereto. For example, the first air vent 132 and the second air vent 134 can be formed by the first casing member 122 and the second casing member 124. Thereby, air can get in and out the device casing 12 through the first air vent 132 and the second air vent 134. In the embodiment, the air flow bypass passage 1246 is disposed near the first air vent 132; therein, one of the two ends of the air flow bypass passage 1246 is disposed near the first air vent 132. The projector 1 includes a fan 18 (shown in dashed lines in FIG. 7) electrically connected to the controller 16 and disposed at the first air vent 132. When the fan 18 operates (e.g. under the control of the controller 16), the fan 18 produces an air flow (indicated by a hollow arrow in FIG. 7) from the outside of the device casing 12 through the first air vent 132 into the internal accommodating space 120, and the air flow mostly flows through the air flow bypass passage 1246 through the two ends of the air flow bypass passage 1246. The air flow then can be guided to flow out of the device casing 12 through the second air vent 134 (for example by another fan disposed at the second air vent 134).

Figure 8:
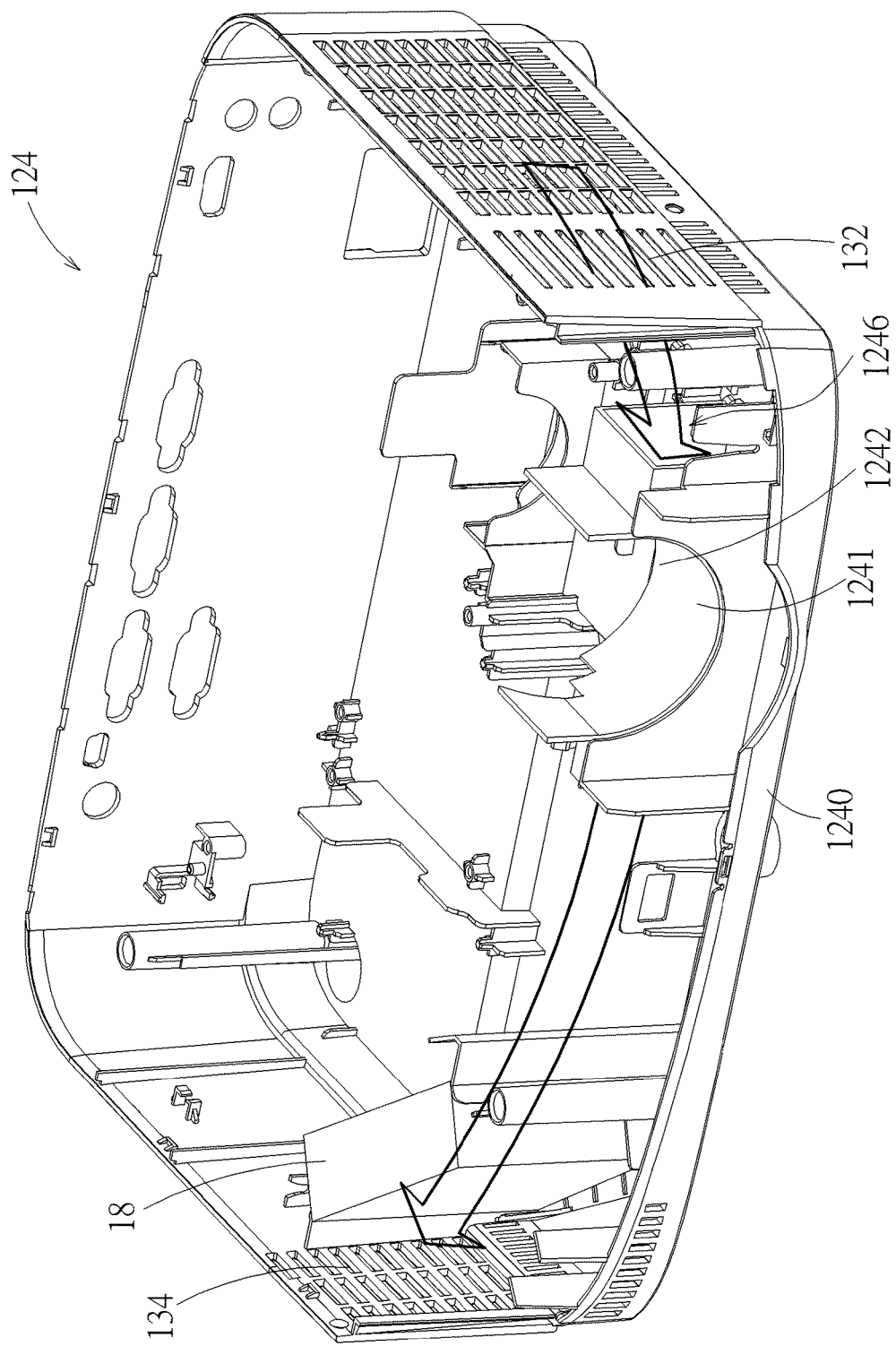
FIG. 8 is a schematic diagram illustrating a disposition of a fan on the second casing member according to another embodiment.

As shown by FIG. 8, in practice, the fan 18 can be disposed at the second air vent 134 instead of the first air vent 132. When the fan 18 operates, the fan 18 also can produce an air flow (indicated by a hollow arrow in FIG. 8) from the outside of the device casing 12 through the first air vent 132 into the internal accommodating space 120, and the air flow mostly flows through the air flow bypass passage 1246 through the two ends of the air flow bypass passage 1246. The air flow then can be guided to flow out of the device casing 12 through the second air vent 134. In addition, in practice, an auxiliary fan can be disposed at the first air vent 132 for assisting in guiding the air flow.

In addition, for both cases above, the air flow enters the device casing 12 through the first air vent 132. For reducing the dust suspended in the air flow, so in practice, a filter can be attached to the first air vent 132 for filtering the dust from the air flow. The air flow passing through the air flow bypass passage 1246 can reduce the temperature of the detachable part 1241 (or the air flow bypass passage 1246). Because the detachable part 1241 (or the air flow bypass passage 1246) is under the projection lens 142, so the projection lens 142 is also cooled indirectly. Furthermore, that the air flow flows inside the device casing 12 will produce a lower pressure inside the device casing 12 relative to the outside of the device casing 12. The engagement of the projection lens 142 with the device casing 12 may be not tight so there may exist gaps, may be due to different coefficients of thermal expansion. The above pressure difference is conducive to drawing the outside air into the device casing 12 through the narrow passage 126 and the gaps. As mentioned above, because the narrow passage 126 exists, the quantity of an air that enters the device casing 12 through the gaps can be reduced. Furthermore, because the narrow passage 126 can reduce the flowing speed of the air flow passing through the narrow passage 126, as a whole, the quantity of the dust into the device casing 12 is also reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device casing, comprising:
a first casing member, having a first indentation; and
a second casing member, comprising a casing member body and a detachable part attached to the casing member body, the detachable part having a second indentation, the first casing member and the second casing member being engaged with each other to form an internal accommodating space and an exposed recess, the first indentation and the second indentation are oppositely disposed to form a component installation opening connected to the internal accommodating space at the exposed recess, the casing member body comprising a bottom wall, the detachable part and the bottom wall forming an air flow bypass passage between the exposed recess and the bottom wall, two ends of the air flow bypass passage being connected to the internal accommodating space, the two ends being located at two sides of the exposed recess.

2. The electronic device casing of claim 1, the electronic device casing having a first side, a second side adjacent to the first side, and an air vent disposed at the second side connecting with the internal accommodating space, wherein the exposed recess is at the first side, and one of the two ends of the air flow bypass passage is disposed near the air vent.

3. The electronic device casing of claim 2, further comprising a fan, disposed at the air vent, wherein when the fan operates, the fan produces an air flow from the outside of the electronic device casing through the air vent into the internal accommodating space, and the air flow mostly flows through the air flow bypass passage through the two ends of the air flow bypass passage.

4. The electronic device casing of claim 1, wherein the first casing member comprises a first side wall, the second casing member comprising a second side wall, the first side wall and the second side wall are oppositely disposed at the exposed recess and form a narrow passage therebetween, the internal accommodating space being connected to an external space of the electronic device casing through the narrow passage, the narrow passage having a non-straight traveling path, and the external space is defined at the exposed recess.

5. The electronic device casing of claim 4, wherein the first side wall comprises a first flat portion, the second side wall comprises a second flat portion and a protrusion protruding from the second flat portion toward the internal accommodating space, the first flat portion and the second flat portion extend in parallel, the first flat portion is located between the second flat portion and the internal accommodating space, the protrusion is near to an edge of the first flat portion, and the narrow passage is formed by the first flat portion, the second flat portion, and the protrusion.

6. A projector, comprising:
    a device casing, comprising:
        a first casing member, comprising a first indentation and a first side wall; and
        a second casing member, the first casing member and the second casing member being engaged with each other to form an internal accommodating space, the second casing member comprising a second indentation and a second side wall, the first side wall and the second side wall being oppositely disposed to form a narrow passage therebetween, the internal accommodating space being connected to an external space of the device casing through the narrow passage, the narrow passage having a non-straight traveling path, the first indentation and the second indentation being oppositely disposed to form a component installation opening connected to the internal accommodating space;
    a light engine, disposed in the internal accommodating space, the light engine comprising a projection lens, the projection lens being disposed near to the narrow passage and passing through the component installation opening; and
    a controller, disposed in the internal accommodating space and electrically connected to the light engine;
wherein the first side wall comprises a first flat portion, the second side wall comprises a second flat portion and a protrusion protruding from the second flat portion toward the internal accommodating space, the first flat portion and the second flat portion extend in parallel, the first flat portion is located between the second flat portion and the internal accommodating space, the protrusion is near to an edge of the first flat portion, and the narrow passage is formed by the first flat portion, the second flat portion, and the protrusion.

7. The projector of claim 6, wherein the narrow passage has an outlet toward the internal accommodating space, and the second side wall has an inner wall surface in the narrow passage opposite to the outlet.

8. A projector, comprising:
    a device casing, comprising:
        a first casing member, comprising a first indentation and a first side wall; and
        a second casing member, the first casing member and the second casing member being engaged with each other to form an internal accommodating space, the second casing member comprising a second indentation and a second side wall, the first side wall and the second side wall being oppositely disposed to form a narrow passage therebetween, the internal accommodating space being connected to an external space of the device casing through the narrow passage, the narrow passage having a non-straight traveling path, the first indentation and the second indentation being oppositely disposed to form a component installation opening connected to the internal accommodating space;
    a light engine, disposed in the internal accommodating space, the light engine comprising a projection lens, the projection lens being disposed near to the narrow passage and passing through the component installation opening; and
    a controller, disposed in the internal accommodating space and electrically connected to the light engine;
wherein the first casing member and the second casing member are engaged with each other to form an exposed recess, the external space is defined at the exposed recess, the first side wall and the second side wall are located at the exposed recess, the component installation opening is located at the exposed recess, and the projection lens extends into the exposed recess.

9. The projector of claim 8, wherein the second casing member comprises a bottom wall and an air flow bypass passage between the exposed recess and the bottom wall, and the air flow bypass passage connects with the internal accommodating space.

10. The projector of claim 9, wherein the device casing has a first side, a second side adjacent to the first side, and an first air vent disposed at the second side connecting with the internal accommodating space, the exposed recess is at the first side, and the air flow bypass passage is disposed near the first air vent.

11. The projector of claim 10, further comprising a fan electrically connected to the controller, wherein the device casing has a third side opposite to the second side and a second air vent disposed at the third side, the fan is disposed at the second air vent, and when the fan operates, the fan produces an air flow from the outside of the device casing through the first air vent into the internal accommodating space, and the air flow mostly flows through the air flow bypass passage through the two ends of the air flow bypass passage.

* * * * *